(12) United States Patent
Kishihara et al.

(10) Patent No.: US 11,499,600 B2
(45) Date of Patent: Nov. 15, 2022

(54) COIL SPRING

(71) Applicants: Suncall Corporation, Kyoto (JP); Toyota Jidosha Kabushiki Kaisha, Toyota (JP)

(72) Inventors: Ryuji Kishihara, Kyoto (JP); Seiji Okamura, Toyota (JP)

(73) Assignee: Suncall Corporation, Kyoto (JP)

( * ) Notice: Subject to any disclaimer, the term of this patent is extended or adjusted under 35 U.S.C. 154(b) by 0 days.

(21) Appl. No.: 17/055,417

(22) PCT Filed: Apr. 24, 2019

(86) PCT No.: PCT/JP2019/017355
§ 371 (c)(1),
(2) Date: Nov. 13, 2020

(87) PCT Pub. No.: WO2019/220892
PCT Pub. Date: Nov. 21, 2019

(65) Prior Publication Data
US 2021/0190163 A1    Jun. 24, 2021

(30) Foreign Application Priority Data
May 16, 2018 (JP) .............................. JP2018-094718

(51) Int. Cl.
*F16F 1/06* (2006.01)
*F16F 1/04* (2006.01)

(52) U.S. Cl.
CPC ................ *F16F 1/06* (2013.01); *F16F 1/042* (2013.01)

(58) Field of Classification Search
CPC .... F16F 1/047; F16F 1/042; F16F 1/06; F16F 1/123; F16F 2238/026; B60G 2202/12
See application file for complete search history.

(56) References Cited

U.S. PATENT DOCUMENTS 2,260,606 A    10/1941 Clark
7,766,312 B2*  8/2010 Takamura ................ F16F 1/06
                                                267/170
(Continued)

FOREIGN PATENT DOCUMENTS

DE    296 12 307 U1    9/1996
EP    0 976 590 A1     2/2000
(Continued)

OTHER PUBLICATIONS

International Search Report issued in International Application No. PCT/JP2019/017355, dated Jun. 18, 2019, 4 pages.
Extended European Search Report issued in European Patent Application No. 19 803 031.4, dated Jan. 20, 2022, 7 pages.

*Primary Examiner* — Thomas W Irvin
(74) *Attorney, Agent, or Firm* — Sterne, Kessler, Goldstein & Fox P.L.L.C.

(57) ABSTRACT

A coil spring of this invention includes a first end coil part with a first bearing surface facing to the first side in the axial direction, a second end coil part with a second bearing surface facing to the second side in the axial direction and a central coil part connecting the first and second end coil parts. A displacement length in the axial direction from the outer end portion until the inner end portion of the first end coil part is a thickness of a spring wire forming the coil spring so that a space between the outer end portion of the first end coil part and an inner end portion of the central coil part is zero, and a displacement length in the axial direction between the outer end portion of the first end coil part and a point away along the circumferential direction from the outer end portion toward the inner end portion of the first end coil part by a half of turn around the axial line is less than a half of the thickness of the spring wire.

8 Claims, 10 Drawing Sheets

(56) References Cited

U.S. PATENT DOCUMENTS

| | | | |
|---|---|---|---|
| 7,857,294 B2* | 12/2010 | Spencer | B29C 53/12 |
| | | | 267/148 |
| 10,690,098 B2* | 6/2020 | Matsumoto | F02M 59/102 |
| 10,808,784 B2* | 10/2020 | Ono | F16F 1/14 |
| 10,995,811 B2* | 5/2021 | Watanabe | F16F 1/047 |
| 2006/0061024 A1* | 3/2006 | Jung | F16F 15/067 |
| | | | 267/167 |
| 2009/0230602 A1* | 9/2009 | Takamura | F16F 1/06 |
| | | | 267/174 |
| 2009/0243174 A1* | 10/2009 | Spencer | B29C 70/32 |
| | | | 267/169 |
| 2014/0262498 A1* | 9/2014 | Hester | F16F 1/00 |
| | | | 174/84 R |
| 2017/0152907 A1* | 6/2017 | Kato | F16F 1/123 |
| 2019/0085927 A1* | 3/2019 | Kishihara | F16F 1/047 |
| 2021/0190162 A1* | 6/2021 | Kishihara | F16F 1/06 |

FOREIGN PATENT DOCUMENTS

| | | | | |
|---|---|---|---|---|
| EP | 2 589 831 A1 | 5/2013 | | |
| EP | 3 444 498 A1 | 2/2019 | | |
| FR | 2 550 295 A1 | 2/1985 | | |
| JP | S5653667 U | 5/1981 | | |
| JP | 1128034 U | 8/1989 | | |
| JP | H10281197 A | 10/1998 | | |
| JP | 2000205320 A | 7/2000 | | |
| JP | 2005-16645 A | 1/2005 | | |
| JP | 2006077904 A | 3/2006 | | |
| JP | 2017190823 A | 10/2017 | | |
| WO | WO-2017002297 A1 * | 1/2017 | | F04B 1/0426 |
| WO | WO-2017179274 A1 * | 10/2017 | | F16F 1/06 |

* cited by examiner

COIL SPRING

FIELD OF THE INVENTION

The present invention relates to a coil spring available for a valve spring for an internal combustion engine, a spring for a high-pressure pump, and the like.

BACKGROUND ART

A coil spring obtained by forming a spring wire into a helical shape that axially extends from one side toward the other side is widely used as a valve spring for an internal combustion engine, a spring for a high-pressure pump, and the like.

This coil spring is a component intended to axially exert elastic force when axially compressed, and is known to also produce, in addition to the elastic force in the axial direction, force (lateral force) in the direction perpendicular to the axial direction when compressed.

Desirably, production of lateral force is prevented as much as possible.

That is to say, for example, when lateral force is produced in the case of using the coil spring as a pressing member for pressing a reciprocating plunger, frictional force produced between the plunger and the guide surface where the plunger is reciprocally accommodated is increased.

An increased frictional force leads to increased wear and frictional heat due to sliding resistance to the plunger, and may result in operational problems of an apparatus such as a high-pressure pump where the plunger is used.

In this regard, the applicants of the present application have proposed coil springs for reducing lateral force (see Patent Literatures 1 and 2 cited below).

The coil spring described in Patent Literature 1 is designed such that the number of active coils between the set height and the maximum height during use is an integer, and thus the coil spring is capable of reducing lateral force compared with coil springs that do not have an integer or near-integer number of active coils.

The coil spring described in Patent Literature 2 is designed such that a helical space defined by a space between coils of the spring wire that are adjacent to each other in an axial direction has a first end region wherein the space between coils of spring wire is increased from a first zero point, where the space between coils of spring wire is zero on a first end side in the axial direction, circumferentially toward a second end side in the axial direction along the helical shape, a reference region located closer to the second end side in the axial direction than the first end region is, wherein the space between coils of spring wire is at a reference value L (L>0), and a second end region located closer to the second end side in the axial direction than the reference region is, wherein the space between coils of spring wire is reduced circumferentially toward the second end side in the axial direction along the helical shape and the space between coils of spring wire in the natural state is zero at a second zero point; in the first and second end regions, the number of turns of the helical space is greater than 1 and the distance of space between coils of spring wire in the natural length state at a terminal position is greater than the reference value L; and the helical space further has a first transitional region between the terminal position of the first end region and the reference region, the first transitional region being configured so that the distance of space between coils of spring wire is reduced from the terminal position of the first end region along the helical shape of the helical space toward the second end side in the axial direction to become the reference value L, and a second transitional region between the terminal position of the second end region and the reference region, the second transitional region being configured so that the distance of space between coils of spring wire is reduced from the terminal position of the second end region along the helical shape of the helical space toward the first end side in the axial direction to become the reference value L.

In comparison with a conventional coil spring designed such that a space between coils of spring wire in the first and second end regions is gradually increased from zero to reach the reference value L as advancing from an outer end side toward an inner end side in the axial direction, the coil spring described in Patent Literature 2 is capable of effectively preventing the space between coils of spring wire from being zero in the first and second end regions when compressed, and thus preventing occurrence of lateral force.

As explained above, the coil spring described in Patent Literatures 1 and 2 can effectively prevent occurrence of lateral force thanks to the respective configurations. However, there is room for improvement in respect to a bearing surface.

Specifically, the coil spring is configured so that a first end coil part on a first end side in the axial direction is provided with a first bearing surface and a second end coil part on a second end side in the axial direction is provided with a second bearing surface.

The first bearing surface is formed by polishing an outer surface of the first end coil part so that the first bearing surface extends in the direction perpendicular to the axial direction of the coil spring. Similarly, the second bearing surface is formed by polishing an outer surface of the second end coil part so that the second bearing surface extends in the direction perpendicular to the axial direction of the coil spring.

Here, in order to prevent occurrence of lateral force to stabilize an attitude of the coil spring when compressed, it is preferable to have each of the first and second bearing surfaces extending over at least half of one turn around the axial line.

However, if the first and second bearing surfaces are simply elongated around the axial line, the end portions of the first and second bearing surfaces becomes thin, and resulting in deterioration of rigidity of the first and second end coil parts.

PRIOR ART DOCUMENT

Patent Literature

Patent Literature 1: JP 2000-205320
Patent Literature 2: JP 2017-190823

DISCLOSURE OF THE INVENTION

The present invention has been conceived in view of such conventional art, and an object of the present invention is to provide a coil spring capable of effectively preventing deterioration of rigidity of an end portion of an end coil part while elongating a bearing surface around an axial line.

In order to achieve the object, a first aspect of the present invention provides a coil spring having a spring wire formed into a helical shape from a first end portion on a first side in an axial direction toward a second end portion on a second side that is opposite to the first side in the axial direction, the coil spring including a first end coil part that has a first bearing surface facing to the first side in the axial direction and extends along a circumferential direction from an outer end portion in the axial direction forming the first end portion toward an inner end portion on the second side in the axial direction, a second end coil part that has a second bearing surface facing to the second side in the axial direction and extends along the circumferential direction from an outer end portion in the axial direction forming the second end portion toward an inner end portion on the first side in the axial direction, and a central coil part extending along the helical shape from the inner end portion of the first end coil part toward the second side in the axial direction and connected to an inner end portion in the axial direction of the second end coil part, wherein a displacement length toward the second side in the axial direction of the first end coil part from the outer end portion until the inner end portion is set to the thickness of the spring wire so that a space between the outer end portion of the first end coil part and an inner end portion on the first side in the axial direction of the central coil part is zero, and wherein a displacement length toward the second side in the axial direction between the outer end portion of the first end coil part and a point away along the circumferential direction from the outer end portion toward the inner end portion of the first end coil part by a half of turn around the axial line is less than a half of the thickness of the spring wire.

The coil spring according to the first aspect of the present invention makes it possible to secure a thickness of the outer end portion of the first end coil part to effectively prevent reduction of rigidity of the first end coil part even if the first bearing surface is formed over a half of turn around the axial line.

In one embodiment of the first aspect, the first end coil part is configured so that a displacement length in the axial direction from the outer end portion of the first end coil part toward the second side in the axial direction until a first inflection point away along the circumferential direction from the outer end portion toward the inner end portion of the first end coil part by more than a half of turn around the axial line is substantially zero, and a displacement length in the axial direction from the first inflection point toward the second side in the axial direction until the inner end portion of the first end coil part is the thickness of the spring wire.

In another embodiment of the first aspect, the first end coil part is configured so that a relationship of the displacement length in the circumferential direction from the outer end portion toward the inner end portion of the first end coil part relative to the displacement length in the axial direction from the outer end portion of the first end coil part toward the second side in the axial direction is defined by a curved line that is opened upward.

In the coil spring according to the first aspect of the present invention, a helical space defined by a space between coils of the spring wire that are adjacent in the axial direction includes a first change region where the space between coils is increased from a first space-between-coils zero point, at which the space between coils is zero between the end portion on the first side in the axial direction of the central coil part and the outer end portion of the first end coil part, toward the second side in the axial direction along the circumferential direction, and a reference region that is located closer to the second side in the axial direction than the first change region is and extends along the circumferential direction toward the second side in the axial direction with the space between coils being kept at a reference value. The first change region ends at a point away from the first space-between-coils zero point on the outer side toward the second side in the axial direction along the circumferential direction by less than one turn around the axial line, the space between coils at the end point on the inner side in the axial direction of the first change region being greater than the reference value. There is provided with a first transitional region between the first change region and the reference region, the space between coils of the first transitional region being reduced from the end of the first change region toward the end portion on the first side in the axial direction of the reference region along the circumferential direction to become the reference value.

In order to achieve the object, a second aspect of the present invention provides a coil spring having a spring wire formed into a helical shape from a first end portion on a first side in an axial direction toward a second end portion on a second side that is opposite to the first side in the axial direction, the coil spring including a first end coil part that has a first bearing surface facing to the first side in the axial direction and extends along a circumferential direction from an outer end portion in the axial direction forming the first end portion toward an inner end portion on the second side in the axial direction, a second end coil part that has a second bearing surface facing to the second side in the axial direction and extends along the circumferential direction from an outer end portion in the axial direction forming the second end portion toward an inner end portion on the first side in the axial direction, and a central coil part extending along the helical shape from the inner end portion of the first end coil part toward the second side in the axial direction and connected to an inner end portion in the axial direction of the second end coil part, wherein a displacement length toward the second side in the axial direction of the first end coil part from the outer end portion until the inner end portion is set to the thickness of the spring wire so that a space between the outer end portion of the first end coil part and an inner end portion on the first side in the axial direction of the central coil part is zero, wherein a displacement length toward the second side in the axial direction between the outer end portion of the first end coil part and a point away along the circumferential direction from the outer end portion toward the inner end portion of the first end coil part by a half of turn around the axial line is less than a half of the thickness of the spring wire, wherein a displacement length toward the first side in the axial direction of the second end coil part from the outer end portion until the inner end portion is set to the thickness of the spring wire so that a space between the outer end portion of the second end coil part and an inner end portion on the second side in the axial direction of the central coil part is zero, and wherein a displacement length toward the first side in the axial direction between the outer end portion of the second end coil part and a point away along the circumferential direction from the outer end portion toward the inner end portion of the second end coil part by a half of turn around the axial line is less than a half of the thickness of the spring wire.

The coil spring according to the second aspect of the present invention makes it possible to secure a thickness of the outer end portion of the second end coil part to effectively prevent reduction of rigidity of the second end coil part even if the second bearing surface is formed over a half of turn around the axial line.

In one embodiment of the second aspect, a displacement length in the axial direction from the outer end portion of the first end coil part toward the second side in the axial direction until a first inflection point away along the circumferential direction from the outer end portion toward the inner end portion of the first end coil part by more than a half of turn around the axial line is substantially zero, a displacement length in the axial direction from the first inflection point toward the second side in the axial direction until the inner end portion of the first end coil part is the thickness of the spring wire, a displacement length in the axial direction from the outer end portion of the second end coil part toward the first side in the axial direction until a second inflection point away along the circumferential direction from the outer end portion toward the inner end portion of the second end coil part by more than a half of turn around the axial line is substantially zero, and a displacement length in the axial direction from the second inflection point toward the first side in the axial direction until the inner end portion of the second end coil part is the thickness of the spring wire.

In another embodiment of the second aspect, a relationship of the displacement length in the circumferential direction from the outer end portion toward the inner end portion of the first end coil part relative to the displacement length in the axial direction from the outer end portion of the first end coil part toward the second side in the axial direction is defined by a curved line that is opened upward, and a relationship of the displacement length in the circumferential direction from the outer end portion toward the inner end portion of the second end coil part relative to the displacement length in the axial direction from the outer end portion of the second end coil part toward the first side in the axial direction is defined by a curved line that is opened downward.

In the coil spring according to the second aspect of the present invention, a helical space defined by a space between coils of the spring wire that are adjacent in the axial direction includes a first change region where the space between coils is increased from a first space-between-coils zero point, at which the space between coils is zero between the end portion on the first side in the axial direction of the central coil part and the outer end portion of the first end coil part, toward the second side in the axial direction along the circumferential direction, a reference region that is located closer to the second side in the axial direction than the first change region is and extends along the circumferential direction toward the second side in the axial direction with the space between coils being kept at a reference value, and a second change region that is located closer to the second side in the axial direction than the reference region 65 is, the space between coils being reduced toward the second side D2 in the axial direction along the circumferential direction, the second change region ending at a second space-between-coils zero point where the space between coils is zero, wherein the first change region ends at a point away from the first space-between-coils zero point on the outer side toward the second side in the axial direction along the circumferential direction by less than one turn around the axial line, the space between coils at the end point on the inner side in the axial direction of the first change region being greater than the reference value, wherein the second change region ends at a point away from the second space-between-coils zero point on the outer side toward the first side in the axial direction along the circumferential direction by less than one turn around the axial line, the space between coils at the end point on the inner side in the axial direction of the second change region being greater than the reference value, wherein a first transitional region is provided between the first change region and the reference region, the space between coils of the first transitional region being reduced from the end of the first change region toward the end portion on the first side in the axial direction of the reference region along the circumferential direction to become the reference value, and wherein a second transitional region is provided between the second change region and the reference region, the space between coils of the second transitional region being reduced from the end of the second change region toward the end portion on the second side in the axial direction of the reference region along the circumferential direction to become the reference value.

EMBODIMENT FOR CARRYING OUT THE INVENTION

Below, one embodiment of the coil spring according to the present invention will now be described with reference to the attached drawings.

FIGS. 1 to 5 show a front view, an upper perspective view, a lower perspective view, plan view and a bottom view, respectively, of a coil spring 1 according to the present embodiment in a natural length state.

As shown in FIGS. 1 to 5, the coil spring 1 according to the present embodiment is obtained by forming a spring wire 100 into a helical shape axially extending from a first end portion 101 on a first side D1, which is one side in the axial direction, to a second end portion 102 on a second side D2, which is the other side in the axial direction, and is suitably used as a valve spring for an internal combustion engine, a spring for a high-pressure pump, and the like.

Although, in the coil spring 1 according to the present embodiment, the spring wire 100 has a circular cross section, it is possible to use spring wires having various cross section such as elliptical cross section, rectangular cross section, and the like.

Figure 1:
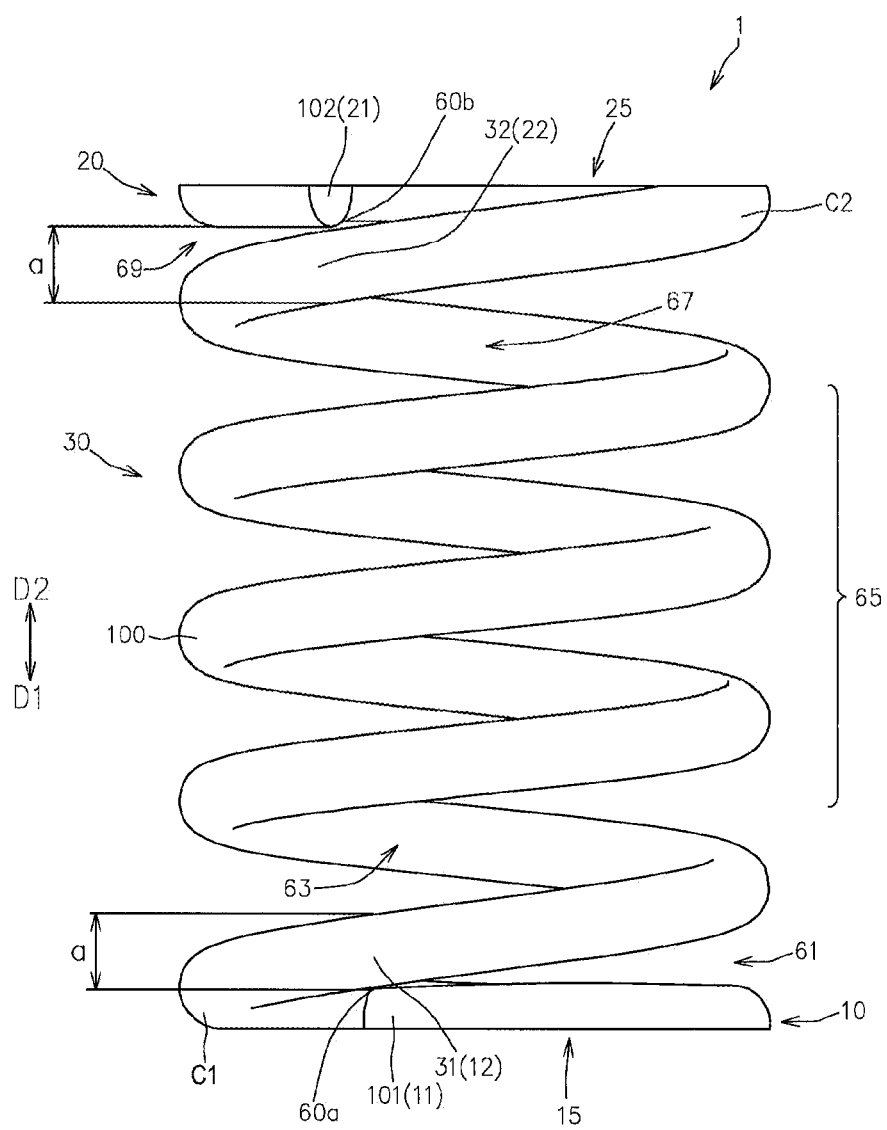
FIG. 1 is a front view of a coil spring according to one embodiment of the present invention, showing the coil spring in a natural length state.
Figure 2:
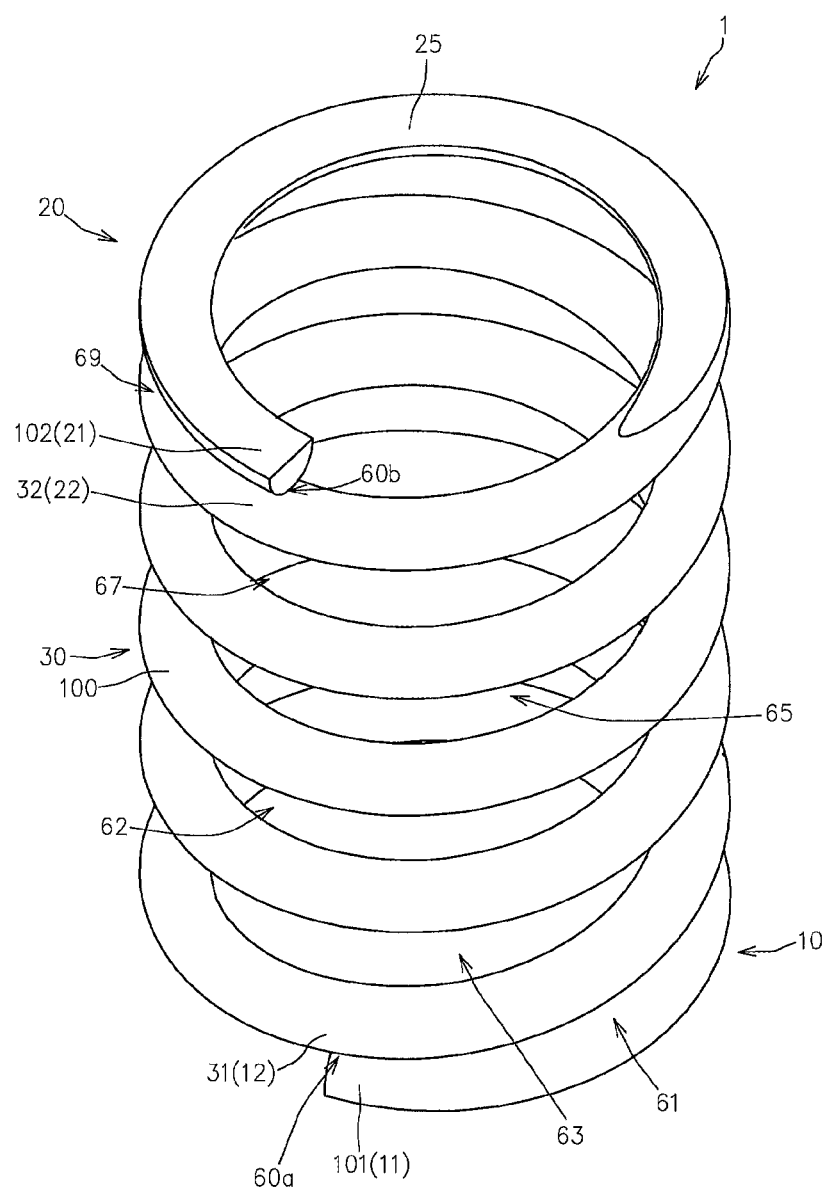
FIG. 2 is an upper perspective view of the coil spring in a natural length state.

As shown in FIG. 1, and the like, the coil spring 1 has a first end coil part 10 extending in the circumferential direction from an outer end portion 11 forming the first end portion 101 toward the second side D2 in the axial direction, a second end coil part 20 extending in the circumferential direction from an outer end portion 21 forming the second end portion 102 toward the first side D1 in the axial direction, and a central coil part 30 extending along the helical shape from an inner end portion 12 in the axial direction of the first end coil part 10 toward the second side D2 in the axial direction and connected to an inner end portion 22 in the axial direction of the second end coil part 20.

Figure 6:
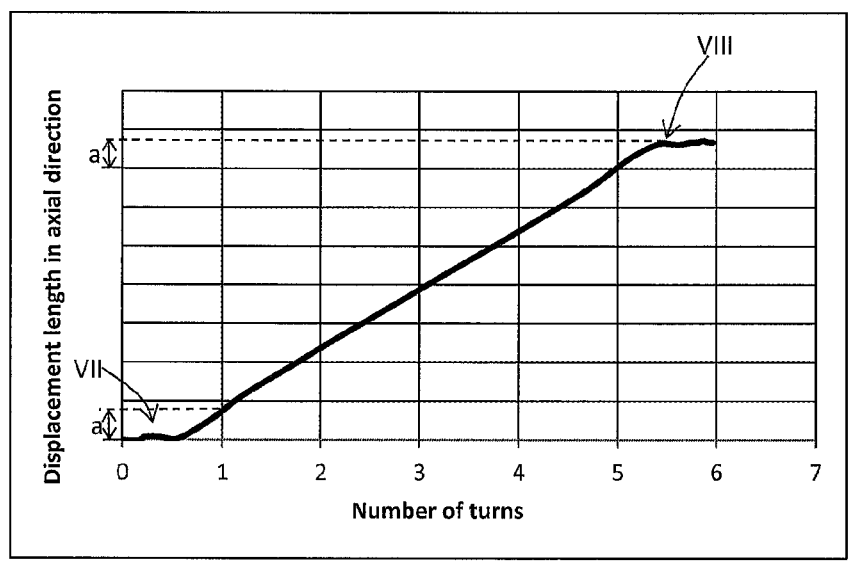
FIG. 6 is a graph showing the relationship between the number of turns and the displacement length in the axial direction of the coil spring.

FIG. 6 is a graph showing the relationship between the number of turns and the displacement length in the axial direction of the coil spring 1.

As shown in FIG. 6, the coil spring 1 according to the present embodiment has 6 turns as a whole including the first end coil part 10, the central part 30 and the second end coil part 20.

Specifically, a point where the number of turns is "0" corresponds to the first end portion 101, and an area from the point where the number of turns is "0" until a point where the number of turns is "1" corresponds to the first end coil part 10.

A point where the number of turns is "6" corresponds to the second end portion 102, an area from a point where the number of turns is "5" until the point where the number of turns is "6" corresponds to the second end coil part 20, and an area from the point where the number of turns is "1" until the point where the number of turns is "5" corresponds to the central coil part 30.

As shown in FIGS. 1 and 6, the first end coil part 10 is displaced toward the second side D2 in the axial direction by a thickness "a" of the spring wire 100 from the outer end portion 11 until the inner end portion 12 in the axial direction, and a space between a coil of spring wire at the outer end portion 11 in the axial direction and a coil of spring wire at an end portion 31 on the first side D1 in the axial direction of the central coil part 30 is zero.

Similarly, the second end coil part 20 is displaced toward the first side in the axial direction by a thickness "a" of the spring wire 100 from the outer end portion 21 until the inner end portion 22 in the axial direction, and a space between a coil of spring wire at the outer end portion 21 in the axial direction and a coil of spring wire at an end portion 32 on the second side D2 in the axial direction of the central coil part 30 is zero.

The first and second coil end parts 10, 20 are provided with first and second bearing surfaces 15, 25 facing outwardly in the axial direction, respectively, which are formed by polishing respective outer surfaces of the first and second coil end parts 10, 20 so that the first and second bearing surfaces 15, 25 extend in the direction perpendicular to the axial direction of the coil spring 1.

The first and second bearing surfaces 15, 25 form mounting surfaces of the coil spring 1. Thus, in order to stabilize an attitude of the coil spring 1 to effectively prevent occurrence of lateral force when the coil spring is compressed, it is preferable to form the first and second bearing surfaces so as to extend over at least half of one turn around the axial line while being perpendicular to the axial direction of the coil spring 1.

However, if the first and second bearing surfaces 15, 25 perpendicular to the axial direction of the coil spring 1 is elongated around the axial line of the coil spring 1, the thickness of the spring wire 100 is become thin at the outer end portions 11, 21 in the axial direction of the first and second end coil part 10, 20. This results in deterioration of rigidity of the first and second end coil parts 10, 20, and involves occurrence of lateral force when the coil spring 1 is compressed.

Figure 3:
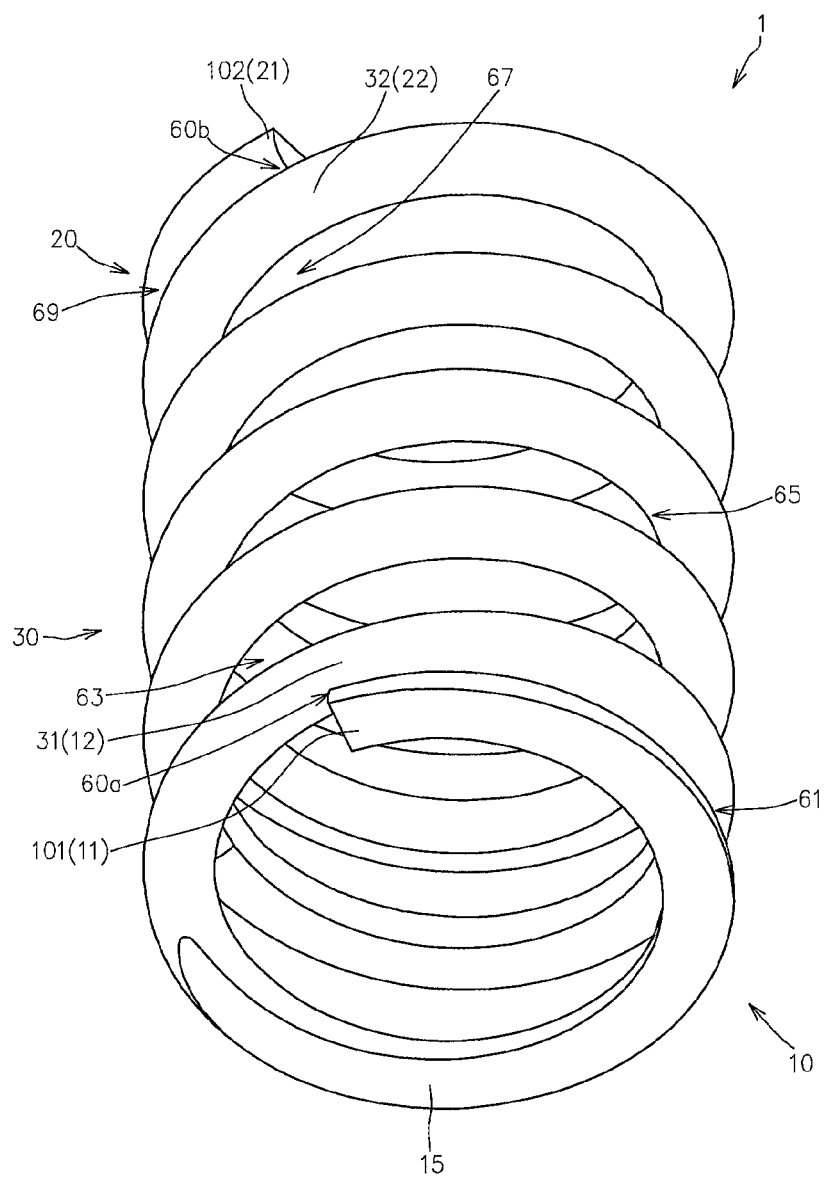
FIG. 3 a lower perspective view of the coil spring in a natural length state.
Figure 4:
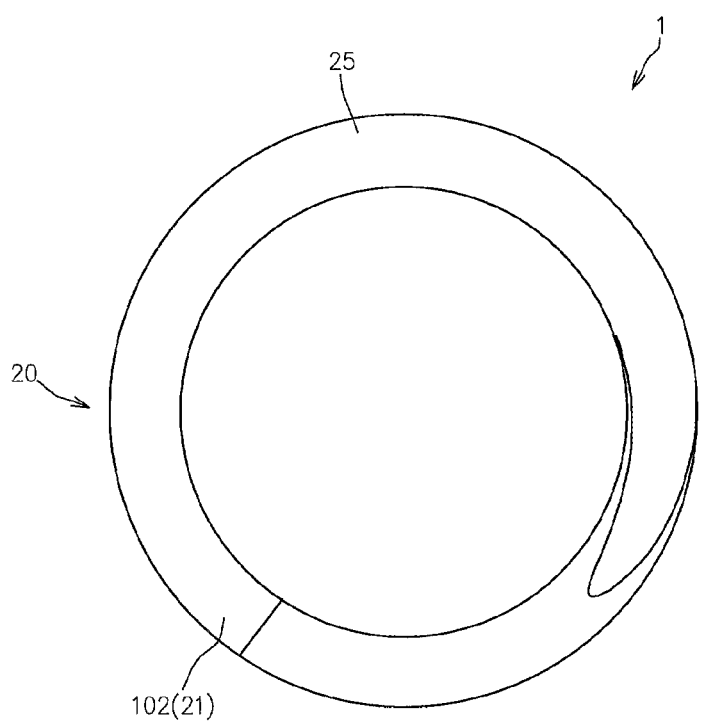
FIG. 4 is a plan view of the coil spring in a natural length state.
Figure 5:
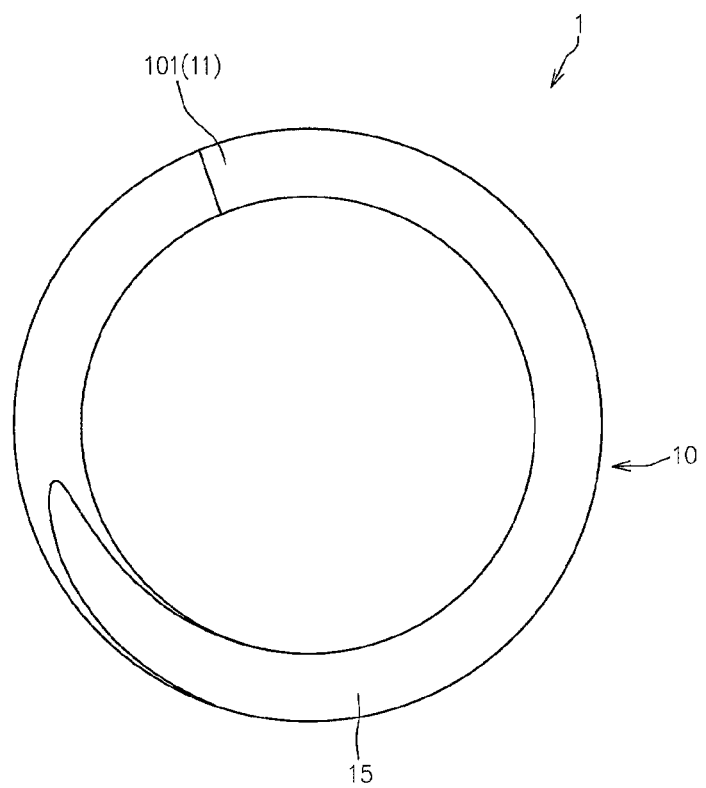
FIG. 5 is a bottom view of the coil spring in a natural length state.

With respect to this point, the coil spring 1 according to the present embodiment with a following configuration can effectively prevent deterioration of rigidity of the first end coil part 10 (and/or the second end coil part 20) while having the first and second bearing surfaces 15, 25 extending over more than or equal to a half of turn (specifically, over three-fourths of turn around the axial line of the coil spring 1 as shown in FIGS. 3 and 4), thereby effectively preventing occurrence of lateral force.

Figure 7:
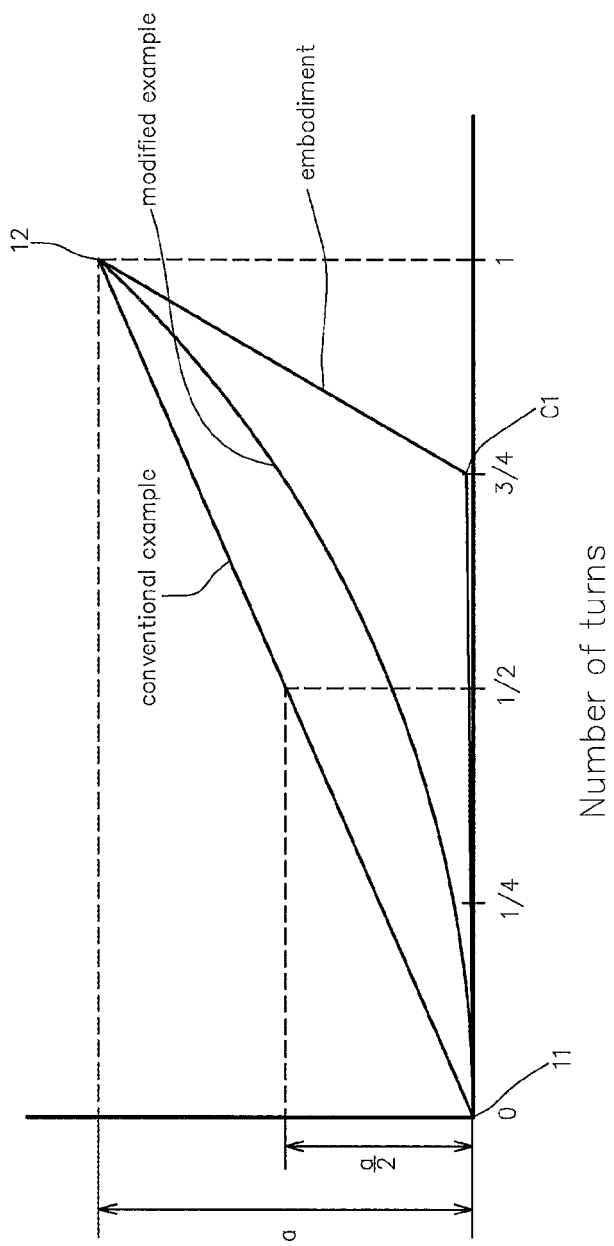
FIG. 7 is an enlarged view of VII part in FIG. 6.

FIG. 7 is an enlarged view of VII part in FIG. 6.

FIG. 7 also shows the relationship between the number of turns and the displacement length in the axial direction of a modified example of the present embodiment and a conventional example.

As shown in FIG. 7, in the conventional coil spring, a displacement length in the axial direction between a point where the number of turns is "0" (the point corresponding to the outer end portion 11 of the first end coil part 10) and a point where the number of turns is "1" (the point corresponding to the inner end portion of the first end coil part 10) is changed with a constant ratio of inclination "a" in a case where the thickness of the spring wire is "a".

Specifically, in the conventional coil spring, the displacement length in the axial direction is "a/4" at a point where the number of turns is "1/4", and the displacement length in the axial direction is "a/2" at a point where the number of turns is "1/2" (the point is away along the circumferential direction from the point corresponding to the outer end portion 11 toward the inner end portion 12 of the first end coil part 10 by a half of turn around the axial line).

On the other hand, in the coil spring 1 according to the present embodiment, the displacement length in the axial direction becomes smaller than a half of the thickness "a" of the spring wire 100 in an area between the outer end portion 11 in the axial direction of the first end coil part 10 and a point away along the circumferential direction from the outer end portion 11 toward the inner end portion 12 by a half of turn around the axial line.

The thus configured coil spring 1 makes it possible to cause the thickness of the outer end portion 11 of the first end coil part 11 to be more than a half of the thickness of the spring wire 100 even if the first bearing surface 15 is formed over a half of turn around the axial line, and thereby effectively securing rigidity of the first end coil part 10.

As shown in FIGS. 1 and 7, in the coil spring 1, the displacement length in the axial direction is substantially zero in the area from the outer end portion 11 of the first end coil part 10 until a first inflection point C1 (a point where the number of turns is "3/4" in the present embodiment) which is beyond a point away along the circumferential direction from the outer end portion by a half of turn around the axial line, and the coil spring 1 is displaced in the axial direction by a length corresponding to the thickness "a" of the spring wire 100 from the first inflection point C1 until the inner end portion 12 (the point where the number of turns is "1") of the first end coil part 10.

The thus configured coil spring 1 makes it possible to cause the thickness of the outer end portion 11 of the first end coil part 11 to be more than a half of the thickness of the spring wire 100 even if the first bearing surface 15 is formed at three-fourths of turn around the axial line.

Figure 8:
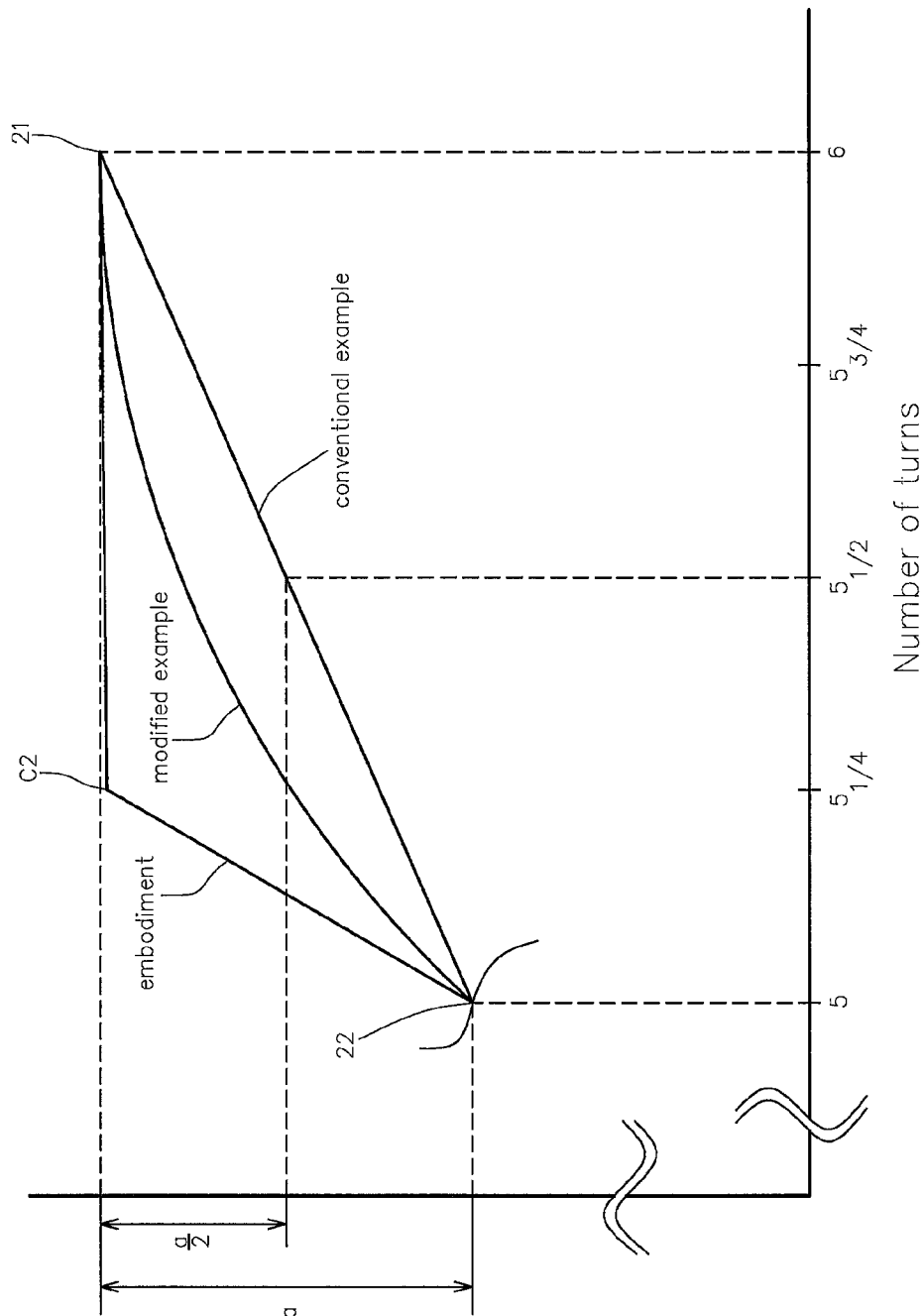
FIG. 8 is an enlarged view of VIII part in FIG. 6.

FIG. 8 is an enlarged view of VIII part in FIG. 6.

FIG. 8 also shows the relationship between the number of turns and the displacement length in the axial direction of the modified example of the present embodiment and the conventional example.

Also in the second end coil part 20 as shown in FIG. 8, the displacement length in the axial direction is substantially zero in the area from the outer end portion 21 of the second end coil part 20 until a second inflection point C2 (a point away along the circumferential direction from the outer end portion 21 of the second end coil part 20 by 3/4 of turn around the axial line in the present embodiment) which is beyond a point away along the circumferential direction from the outer end portion 21 toward the inner end portion 22 of the second end coil part 20 by a half of turn around the axial line, and the coil spring 1 is displaced in the axial direction by a length corresponding to the thickness "a" of the spring wire 100 from the second inflection point C2 until the inner end portion 22.

The thus configured coil spring 1 makes it possible to cause the thickness of the outer end portion 21 of the second end coil part 21 to be more than "a/2" even if the second bearing surface 25 is formed at three-fourths of turn around the axial line.

Alternatively, as in the modified example also shown in FIG. 7, the first end coil part 10 can be formed so that a relationship of a displacement length in the circumferential direction relative to the displacement length toward the second side in the axial direction in the area from the outer end portion 11 toward the inner end portion 12 of the first end coil part 10 is defined by a curved line that is opened upward, which causes the displacement length in the axial direction between the point where the number of turns is "0" (the point corresponding to the outer end portion 11 of the first end coil part 10) and the point where the number of turns is "½" (the point away along the circumferential direction from the outer end portion 11 toward the inner end portion 12 by a half of turn around the axial line) to be less than a half of the thickness "a" of the spring wire 100.

As in the modified example also shown in FIG. 8 the second end coil part 20 can be formed so that a relationship of a displacement length in the circumferential direction relative to the displacement length in the axial direction in the area from the inner end portion 22 toward the outer end portion 21 of the second end coil part 20 is defined by a curved line that is opened downward, which causes the displacement length in the axial direction between the inner end portion 22 and the point away along the circumferential direction from the inner end portion 22 toward the outer end portion 21 by a half of turn around the axial line to be more than a half of the thickness "a" of the spring wire 100 (in other words, in a case of defining the second end coil part 20 with using the outer end portion 21 of the second end coil part 20 as a reference point, the second coil part 20 can be formed so that a relationship of a displacement length in the circumferential direction relative to the displacement length toward the first side in the axial direction in the area from the outer end portion 21 toward the inner end portion 22 of the second end coil part 10 is defined by a curved line that is opened downward, which causes the displacement length toward the first side in the axial direction between the outer end portion 21 of the second end coil part 20 and the point away along the circumferential direction from the outer end portion 21 toward the inner end portion 22 by a half of turn around the axial line to be less than a half of the thickness "a" of the spring wire 100).

The thus configured modified example also can realize the same effect as that of the present embodiment.

Also, in the coil spring 1 according to the present embodiment, the outer end portion 11 of the first end coil part 10 and the outer end portion 21 of the second end coil part 20 are located in circumferentially the same positions. This also makes it possible to effectively prevent occurrence of lateral force during compressional operation.

Moreover, the coil spring 1 according to the present embodiment has a following configuration regarding a helical space defined by a space between coils of the spring wire 100 that are adjacent in the axial direction.

Figure 9:
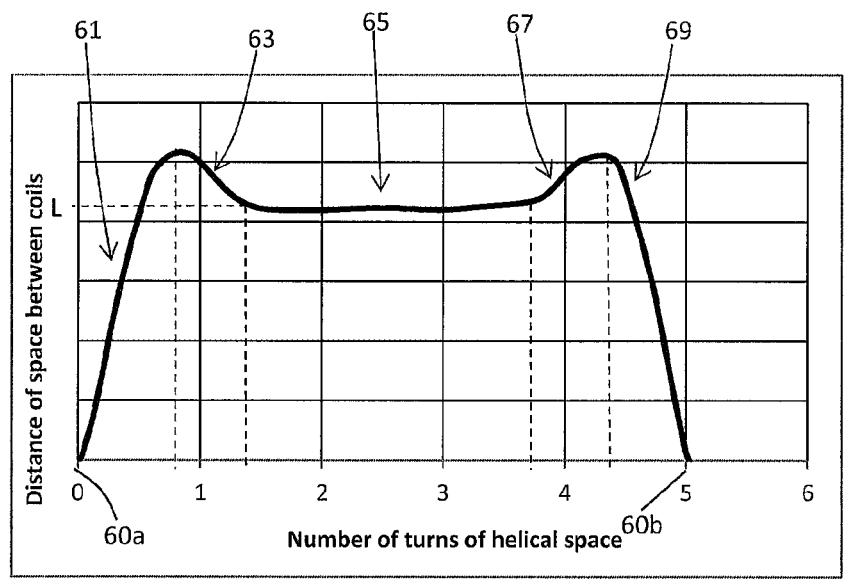
FIG. 9 is a graph showing the relationship between the number of turns of helical space and the distance of the space between coils in the coil spring.

FIG. 9 is a graph showing the relationship between the number of turns of helical space and the distance of the space between coils in the coil spring 1.

"0"-"5" in the number of helical space shown in FIG. 9 correspond to "1"-"6" in the number of turns shown in FIG. 6.

Specifically, as shown in FIGS. 1-3, 5 and 9, the coil spring 1 is configured so that the helical space includes a first change region 61 where the space between coils is increased from a first space-between-coils zero point 60a, at which the space between coils is zero between the end portion 31 on the first side in the axial direction of the central coil part 30 and the outer end portion 11 of the first end coil part 10, toward the second side D2 in the axial direction along the circumferential direction; a reference region 65 that is located closer to the second side D2 in the axial direction than the first change region 61 is and extends along the circumferential direction toward the second side D2 in the axial direction with the space between coils being kept at the reference value L; and a second change region 69 that is located closer to the second side D2 in the axial direction than the reference region 65 is, wherein the space between coils is reduced toward the second side D2 in the axial direction along the circumferential direction and becomes zero at a second space-between-coils zero point 60b.

As shown in FIG. 9, the coil spring 1 according to the present embodiment is configured so that the first change region 61 ends at a point away from the first space-between-coils zero point 60a on the outer end in the axial direction toward the second side D2 in the axial direction along the circumferential direction by less than one turn around the axial line, wherein the space between coils at the end point on the inner side in the axial direction of the first change region 61 is greater than the reference value L; the second change region 69 ends at a point away from the second space-between-coils zero point 60b on the outer end in the axial direction toward the first side D1 in the axial direction along the circumferential direction by less than one turn around the axial line, wherein the space between coils at the end point on the inner side in the axial direction of the second change region 69 is greater than the reference value L; and the helical space further includes a first transitional region 63 that is located between the first change region 61 and the reference region 65, wherein the space between coils is reduced from the end of the first change region 61 toward the end portion on the first side D1 in the axial direction of the reference region 65 along the circumferential direction to become the reference value L, and a second transitional region 67 that is located between the second change region 69 and the reference region 65, wherein the space between coils is reduced from the end of the second change region 69 toward the end portion on the second side D2 in the axial direction of the reference region 65 along the circumferential direction to become the reference value L.

This configuration makes it possible to effectively prevent the space between coils from becoming zero in the first and second change regions 61, 69 when the coil spring 1 is compressed from the natural length state, and it is thus possible to effectively suppress occurrence of lateral force during compressional operation.

That is to say, in the coil spring 1, the spaces between coils at the ends (the ends on the inner side in the axial direction) of the first and second change regions 61, 69 that are located on both sides in the axial direction are greater than the reference value L.

Accordingly, it is possible to effectively prevent the number of active coils from being changed due to unintentional contact between coils that are adjacent in the axial direction on the first side D1 and the second side D2 in the axial direction when the coil spring 1 is compressed, and it is thereby possible to effectively suppress occurrence of lateral force during compressional operation.

Figure 10:
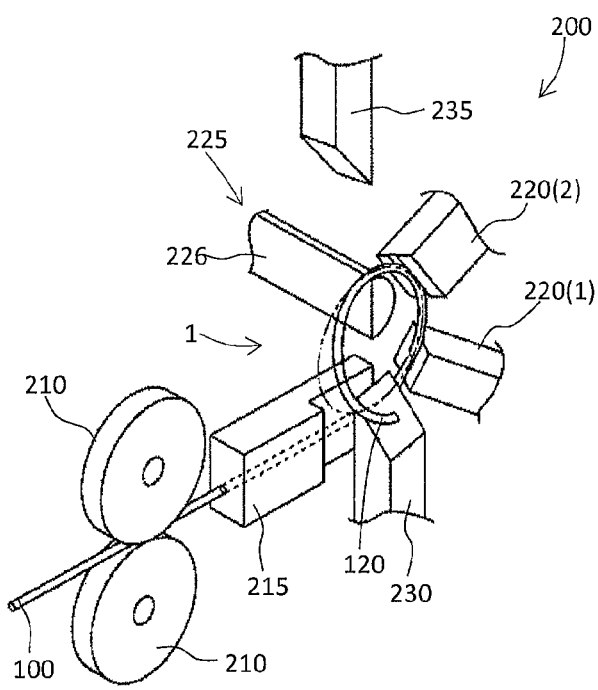
FIG. 10 is a schematic view of a manufacturing apparatus for the coil spring.

The coil spring 1 can be manufactured with, for example, a manufacturing apparatus 200 shown in FIG. 10.

As shown in FIG. 10, the manufacturing apparatus 200 has feed rollers 210 for feeding the spring wire 100; a guide member 215 for guiding the spring wire 100 conveyed by the feed rollers 210; first and second coiling tools 220(1), 220(2) provided downstream in the conveying direction of the spring wire 100 that is conveyed by the feed rollers 210 while being guided by the guide member 215, wherein the first and second coiling tools 220(1), 220(2) forming the helical coil spring 1 from the linear spring wire 100; a core metal member 225 for guiding the coil spring 1 formed into a helical shape by the first and second coiling tools 220(1), 220(2); a pitch tool 230 for adjusting the pitch of the coil spring L and a cutting tool 235 for cutting the spring wire 100 in cooperation with the core metal 225.

The positions of the first and second coiling tools 220(1), 220(2) can be adjusted in the radial direction with reference to the center of the coil spring 1 to be formed, and the coil diameter of the coil spring 1 is changed in accordance with the change of the radial positions of the first and second coiling tools 220(1), 220(2).

The position of the pitch tool 230 can be adjusted in the radial direction with reference to the center of the coil spring 1, and the pitch of the coil spring 1 is changed in accordance with the change of the radial position of the pitch tool 230.

The cutting tool 235 is radially reciprocable with reference to the center of the coil spring 1, and is movable between a cutting position for cutting the spring wire 100 in cooperation with an engagement surface 226 of the core metal 225 and a retreated position away from the core metal 225.

DESCRIPTION OF THE REFERENCE NUMERALS 1 coil spring
10 first end coil part
11 outer end portion of first end coil part
12 inner end portion of first end coil part
20 second end coil part
21 outer end portion of second end coil part
22 inner end portion of second end coil part
30 central coil part
31 end portion on first side in axial direction of central coil part
32 end portion on second side in axial direction of central coil part
60a first space-between-coils zero point
60b second space-between-coils zero point
61 first change region
63 first transitional region
65 reference region
67 second transitional region
69 second change region
100 spring wire
101 first end portion
102 second end portion
C1 first inflection point
C2 second inflection point
D1 first side in axial direction
D2 second side in the axial direction

The invention claimed is:

1. A coil spring having a spring wire formed into a helical shape from a first end portion on a first side in an axial direction toward a second end portion on a second side in the axial direction, the coil spring comprising:
    a first end coil part that has a first bearing surface facing to the first side in the axial direction and extends along a circumferential direction from an outer end portion in the axial direction forming the first end portion toward an inner end portion on the second side in the axial directions;
    a second end coil part that has a second bearing surface facing to the second side in the axial direction and extends along the circumferential direction from an outer end portion in the axial direction forming the second end portion toward an inner end portion on the first side in the axial direction;
    a central coil part extending along the helical shape from the inner end portion of the first end coil part toward the second side in the axial direction and connected to an inner end portion in the axial direction of the second end coil part;
    a displacement length toward the second side in the axial direction of the first end coil part from the outer end portion until the inner end portion being set to the thickness of the spring wire so that a space between the outer end portion of the first end coil part and an inner end portion on the first side in the axial direction of the central coil part is zeros; and
    a displacement length toward the second side in the axial direction between the outer end portion of the first end coil part and a point away along the circumferential direction from the outer end portion toward the inner end portion of the first end coil part by a half of turn around the axial line being less than a half of the thickness of the spring wire,
    wherein a relationship of the displacement length in the circumferential direction from the outer end portion toward the inner end portion of the first end coil part relative to the displacement length in the axial direction from the outer end portion of the first end coil part toward the second side in the axial direction is defined by a curved line that is opened upward.

2. A coil spring according to claim 1, wherein;
    a helical space defined by a space between coils of the spring wire that are adjacent in the axial direction includes a first change region where the space between coils is increased from a first space-between-coils zero point, at which the space between coils is zero between the end portion on the first side in the axial direction of the central coil part and the outer end portion of the first end coil part, toward the second side in the axial direction along the circumferential direction, and a reference region that is located closer to the second side in the axial direction than the first change region is and extends along the circumferential direction toward the second side in the axial direction with the space between coils being kept at a reference value,
    the first change region ends at a point away from the first space-between-coils zero point on the outer side toward the second side in the axial direction along the circumferential direction by less than one turn around the axial line, the space between coils at the end point on the inner side in the axial direction of the first change region being greater than the reference value, and
    a first transitional region is provided between the first change region and the reference region, the space between coils of the first transitional region being reduced from the end of the first change region toward the end portion on the first side in the axial direction of the reference region along the circumferential direction to become the reference value.

3. A coil spring having a spring wire formed into a helical shape from a first end portion on a first side in an axial direction toward a second end portion on a second side in the axial direction, the coil spring comprising:
- a first end coil part that has a first bearing surface facing to the first side in the axial direction and extends along a circumferential direction from an outer end portion in the axial direction forming the first end portion toward an inner end portion on the second side in the axial direction;
- a second end coil part that has a second bearing surface facing to the second side in the axial direction and extends along the circumferential direction from an outer end portion in the axial direction forming the second end portion toward an inner end portion on the first side in the axial direction;
- a central coil part extending along the helical shape from the inner end portion of the first end coil part toward the second side in the axial direction and connected to an inner end portion in the axial direction of the second end coil part; and
- a displacement length toward the second side in the axial direction of the first end coil part from the outer end portion until the inner end portion being set to the thickness of the spring wire so that a space between the outer end portion of the first end coil part and an inner end portion on the first side in the axial direction of the central coil part is zero,
- wherein a displacement length in the axial direction from the outer end portion of the first end coil part toward the second side in the axial direction until a first inflection point away along the circumferential direction from the outer end portion toward the inner end portion of the first end coil part by more than a half of turn around the axial line is substantially zero, and
- wherein a displacement length in the axial direction from the first inflection point toward the second side in the axial direction until the inner end portion of the first end coil part is the thickness of the spring wire.

4. A coil spring according to claim 3, wherein:
- a helical space defined by a space between coils of the spring wire that are adjacent in the axial direction includes a first change region where the space between coils is increased from a first space-between-coils zero point, at which the space between coils is zero between the end portion on the first side in the axial direction of the central coil part and the outer end portion of the first end coil part, toward the second side in the axial direction along the circumferential direction, and a reference region that is located closer to the second side in the axial direction than the first change region is and extends along the circumferential direction toward the second side in the axial direction with the space between coils being kept at a reference value,
- the first change region ends at a point away from the first space-between-coils zero point on the outer side toward the second side in the axial direction along the circumferential direction by less than one turn around the axial line, the space between coils at the end point on the inner side in the axial direction of the first change region being greater than the reference value, and
- a first transitional region is provided between the first change region and the reference region, the space between coils of the first transitional region being reduced from the end of the first change region toward the end portion on the first side in the axial direction of the reference region along the circumferential direction to become the reference value.

5. A coil spring having a spring wire formed into a helical shape from a first end portion on a first side in an axial direction toward a second end portion on a second side in the axial direction, the coil spring comprising:
- a first end coil part that has a first bearing surface facing to the first side in the axial direction and extends along a circumferential direction from an outer end portion in the axial direction forming the first end portion toward an inner end portion on the second side in the axial direction;
- a second end coil part that has a second bearing surface facing to the second side in the axial direction and extends along the circumferential direction from an outer end portion in the axial direction forming the second end portion toward an inner end portion on the first side in the axial direction;
- a central coil part extending along the helical shape from the inner end portion of the first end coil part toward the second side in the axial direction and connected to an inner end portion in the axial direction of the second end coil part;
- a displacement length toward the second side in the axial direction of the first end coil part from the outer end portion until the inner end portion being set to the thickness of the spring wire so that a space between the outer end portion of the first end coil part and an inner end portion on the first side in the axial direction of the central coil part is zero;
- a displacement length toward the second side in the axial direction between the outer end portion of the first end coil part and a point away along the circumferential direction from the outer end portion toward the inner end portion of the first end coil part by a half of turn around the axial line being less than a half of the thickness of the spring wire;
- a displacement length toward the first side in the axial direction of the second end coil part from the outer end portion until the inner end portion being set to the thickness of the spring wire so that a space between the outer end portion of the second end coil part and an inner end portion on the second side in the axial direction of the central coil part is zero; and
- a displacement length toward the first side in the axial direction between the outer end portion of the second end coil part and a point away along the circumferential direction from the outer end portion toward the inner end portion of the second end coil part by a half of turn around the axial line being less than a half of the thickness of the spring wire,
- wherein a relationship of the displacement length in the circumferential direction from the outer end portion toward the inner end portion of the first end coil part relative to the displacement length in the axial direction from the outer end portion of the first end coil part toward the second side in the axial direction is defined by a curved line that is opened upward, and
- wherein a relationship of the displacement length in the circumferential direction from the outer end portion toward the inner end portion of the second end coil part relative to the displacement length in the axial direction from the outer end portion of the second end coil part toward the first side in the axial direction is defined by a curved line that is opened downward.

6. A coil spring according to claim 5, wherein:
a helical space defined by a space between coils of the spring wire that are adjacent in the axial direction includes a first change region where the space between coils is increased from a first space-between-coils zero point, at which the space between coils is zero between the end portion on the first side in the axial direction of the central coil part and the outer end portion of the first end coil part, toward the second side in the axial direction along the circumferential direction, a reference region that is located closer to the second side in the axial direction than the first change region is and extends along the circumferential direction toward the second side in the axial direction with the space between coils being kept at a reference value, and a second change region that is located closer to the second side in the axial direction than the reference region is, the space between coils being reduced toward the second side in the axial direction along the circumferential direction, the second change region ending at a second space-between-coils zero point where the space between coils is zero,
the first change region ends at a point away from the first space-between-coils zero point on the outer side toward the second side in the axial direction along the circumferential direction by less than one turn around the axial line, the space between coils at the end point on the inner side in the axial direction of the first change region being greater than the reference value,
the second change region ends at a point away from the second space-between-coils zero point on the outer side toward the first side in the axial direction along the circumferential direction by less than one turn around the axial line, the space between coils at the end point on the inner side in the axial direction of the second change region being greater than the reference value,
a first transitional region is provided between the first change region and the reference region, the space between coils of the first transitional region being reduced from the end of the first change region toward the end portion on the first side in the axial direction of the reference region along the circumferential direction to become the reference value, and
a second transitional region is provided between the second change region and the reference region, the space between coils of the second transitional region being reduced from the end of the second change region toward the end portion on the second side in the axial direction of the reference region along the circumferential direction to become the reference value.

7. A coil spring having a spring wire formed into a helical shape from a first end portion on a first side in an axial direction toward a second end portion on a second side in the axial direction, the coil spring comprising:
a first end coil part that has a first bearing surface facing to the first side in the axial direction and extends along a circumferential direction from an outer end portion in the axial direction forming the first end portion toward an inner end portion on the second side in the axial direction;
a second end coil part that has a second bearing surface facing to the second side in the axial direction and extends along the circumferential direction from an outer end portion in the axial direction forming the second end portion toward an inner end portion on the first side in the axial direction;
a central coil part extending along the helical shape from the inner end portion of the first end coil part toward the second side in the axial direction and connected to an inner end portion in the axial direction of the second end coil part;
a displacement length toward the second side in the axial direction of the first end coil part from the outer end portion until the inner end portion being set to the thickness of the spring wire so that a space between the outer end portion of the first end coil part and an inner end portion on the first side in the axial direction of the central coil part is zero;
a displacement length toward the second side in the axial direction between the outer end portion of the first end coil part and a point away along the circumferential direction from the outer end portion toward the inner end portion of the first end coil part by a half of turn around the axial line being less than a half of the thickness of the spring wire;
a displacement length toward the first side in the axial direction of the second end coil part from the outer end portion until the inner end portion being set to the thickness of the spring wire so that a space between the outer end portion of the second end coil part and an inner end portion on the second side in the axial direction of the central coil part is zero; and
a displacement length toward the first side in the axial direction between the outer end portion of the second end coil part and a point away along the circumferential direction from the outer end portion toward the inner end portion of the second end coil part by a half of turn around the axial line being less than a half of the thickness of the spring wire,
wherein a displacement length in the axial direction from the outer end portion of the first end coil part toward the second side in the axial direction until a first inflection point away along the circumferential direction from the outer end portion toward the inner end portion of the first end coil part by more than a half of turn around the axial line is substantially zero,
wherein a displacement length in the axial direction from the first inflection point toward the second side in the axial direction until the inner end portion of the first end coil part is the thickness of the spring wire,
wherein a displacement length in the axial direction from the outer end portion of the second end coil part toward the first side in the axial direction until a second inflection point away along the circumferential direction from the outer end portion toward the inner end portion of the second end coil part by more than a half of turn around the axial line is substantially zero, and
wherein a displacement length in the axial direction from the second inflection point toward the first side in the axial direction until the inner end portion of the second end coil part is the thickness of the spring wire.

8. A coil spring according to claim 7, wherein:
a helical space defined by a space between coils of the spring wire that are adjacent in the axial direction includes a first change region where the space between coils is increased from a first space-between-coils zero point, at which the space between coils is zero between the end portion on the first side in the axial direction of the central coil part and the outer end portion of the first end coil part, toward the second side in the axial direction along the circumferential direction, a reference region that is located closer to the second side in the axial direction than the first change region is and extends along the circumferential direction toward the second side in the axial direction with the space between coils being kept at a reference value, and a second change region that is located closer to the second side in the axial direction than the reference region is, the space between coils being reduced toward the second side in the axial direction along the circumferential direction, the second change region ending at a second space-between-coils zero point where the space between coils is zero, the first change region ends at a point away from the first space-between-coils zero point on the outer side toward the second side in the axial direction along the circumferential direction by less than one turn around the axial line, the space between coils at the end point on the inner side in the axial direction of the first change region being greater than the reference value, the second change region ends at a point away from the second space-between-coils zero point on the outer side toward the first side in the axial direction along the circumferential direction by less than one turn around the axial line, the space between coils at the end point on the inner side in the axial direction of the second change region being greater than the reference value, a first transitional region is provided between the first change region and the reference region, the space between coils of the first transitional region being reduced from the end of the first change region toward the end portion on the first side in the axial direction of the reference region along the circumferential direction to become the reference value, and a second transitional region is provided between the second change region and the reference region, the space between coils of the second transitional region being reduced from the end of the second change region toward the end portion on the second side in the axial direction of the reference.

\* \* \* \* \*

UNITED STATES PATENT AND TRADEMARK OFFICE
CERTIFICATE OF CORRECTION

| | |
|---|---|
| PATENT NO. | : 11,499,600 B2 |
| APPLICATION NO. | : 17/055417 |
| DATED | : November 15, 2022 |
| INVENTOR(S) | : Kishihara et al. |

It is certified that error appears in the above-identified patent and that said Letters Patent is hereby corrected as shown below:

In the Claims

In Column 12, Claim 1, Line 11, delete "directions;" and insert -- direction; --, therefor.

In Column 12, Claim 1, Line 29, delete "zeros;" and insert -- zero; --, therefor.

In Column 12, Claim 2, Line 44, delete "wherein;" and insert -- wherein: --, therefor.

Signed and Sealed this
Thirty-first Day of January, 2023

*Katherine Kelly Vidal*

Katherine Kelly Vidal
*Director of the United States Patent and Trademark Office*